United States Patent

Christel

Patent Number: 5,770,274
Date of Patent: Jun. 23, 1998

[54] METHOD FOR PRODUCING EXTRUSION-COATED LAMINATES

[75] Inventor: Andreas Christel, Schaffhausen, Switzerland

[73] Assignees: Alusuisse Technology & Management Ltd., Neuhausen am Rheinfall, Switzerland; Softal Electronic GmbH, Hamburg, Germany

[21] Appl. No.: 239,384

[22] Filed: May 6, 1994

Related U.S. Application Data

[62] Division of Ser. No. 974,559, Nov. 12, 1992, abandoned.

[30] Foreign Application Priority Data

Dec. 11, 1991 [CH] Switzerland ............... 3645/91

[51] Int. Cl.⁶ ...................................... B05D 3/06
[52] U.S. Cl. ................ 427/535; 427/562; 427/539; 427/398.2; 427/428; 156/244.17; 156/244.24; 156/272.6; 156/274.6; 264/483
[58] Field of Search ........................ 427/535, 428, 427/562, 539, 398.2; 156/244.17, 244.24, 272.6, 274.6; 264/22, 483

[56] References Cited

U.S. PATENT DOCUMENTS

| | | | |
|---|---|---|---|
| 3,371,002 | 2/1968 | Reddeman | 156/244.17 |
| 3,744,898 | 7/1973 | Kurahashi et al. | 355/3 |
| 4,244,894 | 1/1981 | Segransan | 264/22 |
| 4,487,880 | 12/1984 | Ueno | 427/539 |
| 5,038,036 | 8/1991 | Kouguchi | 264/22 |

FOREIGN PATENT DOCUMENTS

| | | | |
|---|---|---|---|
| 2433224 | 1/1976 | Germany | 156/244.17 |
| 1093815 | 12/1967 | United Kingdom | 427/535 |

*Primary Examiner*—Roy V. King
*Attorney, Agent, or Firm*—Bachman & LaPointe, P.C.

[57] ABSTRACT

The invention describes a process for producing extrusion-coated laminates, which comprises subjecting the surface of an extruded film to a corona discharge treatment while the film is in a partially molten state in order to improve the adhesion of the film to a substrate.

8 Claims, 2 Drawing Sheets

METHOD FOR PRODUCING EXTRUSION-COATED LAMINATES

This is a Division of application Ser. No. 07/974,559, filed Nov. 12, 1992, now abandoned.

BACKGROUND OF THE INVENTION

The present invention relates to a device and a process for producing extrusion-coated laminates. The device contains an extruder nozzle with nozzle lip, a cooling roller and a contact roller, wherein the cooling roller and the contact roller form a roller gap and the extruder nozzle is directed towards the roller gap and a melt of thermoplastic plastics emerges from the nozzle lip and enters the roller gap while forming a coating film and is joined to a substrate film in the roller gap, wherein a device for promoting adhesion of the coating film to the substrate film is disposed in the region between the extruder nozzle and the roller gap at a slight distance from the film.

It is known to take various measures to improve the joining adhesion between the individual materials of a laminate during extrusion coating. Polyethylene is melted and a polyethylene film is produced via an extruder nozzle for extrusion coating of substrate films, such as metal films, plastic films, papers or composites therefrom, for example using a polyethylene film. The polyethylene film is taken up between two rollers, a cooling roller and a contact roller. As a rule, a substrate film is supplied via the contact roller. The extruded polyethylene film and the substrate film are joined to one another between the cooling roller and the contact roller.

Various processes are used to improve adhesion of a polyethylene film to a substrate film. These processes prepare the surface of the substrate materials. The corona process and/or chemical priming and/or the use of an adhesion promoter should be mentioned here in particular. Furthermore, the finished product may be thermally treated. In the corona treatment, the surfaces of the substrate materials are bombarded at high frequency using an electric spark discharge and this leads to the formation of adhesion-active groups. In chemical priming, an intermediate layer is applied which is firmly anchored on the substrate web and on the other side forms adhesive bridges with the polyethylene. A further physically effective process which should provide the required adhesion between substrate film and polyethylene film consists in it being possible to positively influence the oxidation of the molten PE film directly before contact with the substrate film by means of ozone treatment. For this ozone should be blown onto the polyethylene film with low losses at the technically highest possible concentration. (Publication from Softal Elektronik GmbH, D 2000 Hamburg 70, "Sorbex", Ozoneanlage zur Verbesserung der Verbundhaftung bei der Extrusionsbeschichtung (Ozone plant for improving adhesive bonding in extrusion coating)). It has also been shown that in extrusion coating the molten PE film can only be treated indirectly by means of ozone. (Softal Report 2 from Messrs. Softal Elektronik GmbH, D 2000 Hamburg 70).

However, in practice it is desirable to dispense with ozone treatment.

The object of the present invention is to provided a device and a process which makes it possible to carry out extrusion coating of a substrate film which leads to joining with high adhesion between extrusion film and substrate film.

SUMMARY OF THE INVENTION

This is achieved in accordance with the invention in that the device is a corona treatment station which has a corona treatment station without a counter-electrode. The device of the invention may, for example be applied to extrusion coating devices which are known per se. Devices of this type contain, for example an extruder in which the thermoplastic plastic is melted and the melt is extruded through a nozzle lip to form a film. The hot melt of thermoplastic plastic is cooled while forming the film. This film is passed between a cooling roller and a contact roller as a coating film. The cooling roller and the contact roller form a roller gap which as a rule is disposed vertically below the nozzle lip. The substrate film is guided into the roller gap via the contact roller and the coating film is applied adhesively to the substrate film. The substrate film may contain various materials. The substrate film may be, for example a metal film, a plastic film or a paper web, or the substrate film may be a composite of metal, paper web and/or plastic films, such as for example a composite of metal and plastic films, or a composite of paper and plastic films, a composite of metal and paper films or a composite of several plastic films. The substrate film may also be a composite of several plastic films, of several plastic films having at least one metal film, or of several plastic films having at least one paper web. Thermoplastic plastics or metal films are preferably used as materials for the substrate.

DETAILED DESCRIPTION OF PREFERRED EMBODIMENTS

Figure 1:
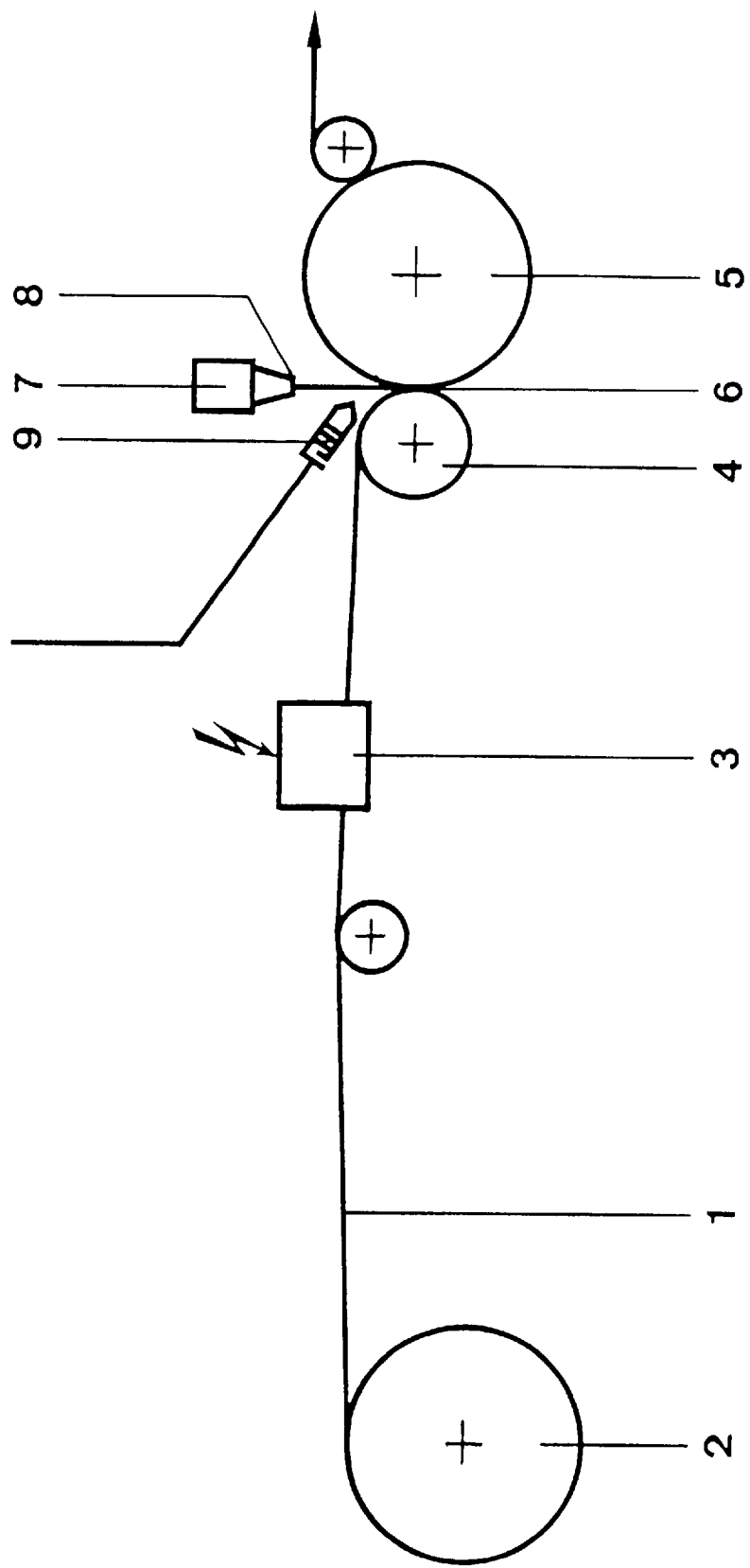
FIG. 1 is a schematic representation of the device for producing laminates according to the present invention.

Examples of metal films which may be used are films of aluminium, tin, silver, gold, copper, iron or steel.

A preferred metal film is a film of aluminum or aluminum alloys, aluminum having a purity of, for example 96% and higher advantageously, 98.6% and higher preferably, and 99.6% and higher in particular, being used. The aluminum films should advantageously be particularly flexible, fine-grained and/or texture-free. The preferred aluminum alloys for the said films are those of the type AA 8079 or AA 8101.

The thickness of the films of aluminum or aluminum alloys is, for example 3 to 100 $\mu$m, advantageously 7 to 60 $\mu$m, and preferably 10 to 50 $\mu$m.

Suitable thermoplastic plastics for forming the film in the extruder and plastic films for forming the substrate films or as a constituent of the substrate films are thermoplastic polymers. The thermoplastic polymers or thermoplastics based on acetal, acrylic, amide, arylenesulphide, arylenesulphone, carbonate, cellulose, ester, imide, olefin, styrene and vinyl may be listed as examples.

Examples of thermoplastics based on acetal are polyvinylbutyral, polyformaldehyde, polyacetaldehyde, mixed polymers and terpolymers of the same.

Examples of thermoplastics based on acrylic are polyalkylmethacrylates, for example polymethylmethacrylates, polytert.butylacrylate, mixed polymers and terpolymers of the same, vinyl, styrene, acrylate ester and methacrylate ester mixed polymers and terpolymers of acrylonitrile and methacrylonitrile.

Examples of thermoplastics based on amide include polyamide 6, a homopolymer of $\epsilon$-caprolactam (polycaprolactam); polyamide 11, a polymer of 11-aminoundecanic acid (poly-11-aminoundecanamide); polyamide 12, a homopolymer of $\omega$-lauric lactam (polylauric lactam); polyamide 6,6, a homopolymer of hexamethylene-diamine and adipic acid (polyhexamethylene adipamide); polyamide 6,10, a homopolymer of hexamethylenediamine and sebacic acid (polyhexamethylene sebacamide); polyamide 6,12, a homopolymer of hexamethylene diamine and dodecanic diacid (polyhexamethylene dodecanamide) or polyamide 6-3-T, a homopolymer of trimethylhexamethylene diamine and terephthalic acid (polytrimethylhexamethylene terephthalamide), and mixtures thereof.

Examples of thermoplastics based on carbonate are polycarbonates based on 2,2-(4,4-dihydroxy-diphenol)-propane or other dihydroxydiarylalkanes or mixtures of dihydroxydiarylalkanes with other aromatic or aliphatic dihydroxy compounds, such as 2,2-(4,4'-dihydroxy-3,3',5,5'-tetrabromodiphenyl)-propane and 2,2-(4,4'-dihydroxy-3,3', 5,5'-tetramethyldiphenyl)-propane or are based on 1,1-(4,4'-dihydroxy-3,3',5,5'-tetrachlorodiphenyl)-propane or 2,2-(4, 4'-dihydroxy-3,3',5,5'-tetramethyldiphenyl)-propane, in each case reacted, for example with phosgene or diphenyl carbonate. Modified polycarbonates, polycarbonates grafted onto a vinyl polymer or polycarbonates mixed, for example with ABS polymers, are also included.

Examples of thermoplastics based on esters are polyalkylene terephthalates or polyalkylene isophthalates, having alkylene groups or radicals with 2 to about 10 carbon atoms, wherein the alkylene groups or radicals may also be interrupted by at least one —O—, such as for example polyethylene terephthalate, polybutylene terephthalate (polytetramethylene terephthalate), polydecamethylene terephthalate, poly-1,4-cyclohexyldimethylol terephthalate, mixed polymers and terpolymers thereof.

Examples of thermoplastics based on arylene oxide, arylene sulphone and arylene sulphide are polyphenylene oxide, polyphenylene sulphide, polyether sulphone, polyaryl ether, polyaryl sulphone or polysulphone. Thermoplastics based on acetal, acrylic, ester and arylene may, for example also be used as block copolymers or as graft polymers.

Thermoplastics based on cellulose are, for example cellulose esters, such as cellulose acetate, cellulose propionate, cellulose butyrate and cellulose acetate butyrate or polymer-modified cellulose acetate butyrate.

Examples of thermoplastics based on imide are poly-N-alkylene maleimides, such as poly-N-methylene maleimide, mixed polymers, terpolymers or block mixed polymer and grafted rubber modifications of the same, furthermore, polyimides and copoly-(imide/amides) of pyromellitic dianhydride and m-phenylene diamine or similar polyarylene imides and copoly-(arylene imide/amides).

Examples of thermoplastics based on olefin are polyolefins, such as polyethylene, for example high density polyethylene (HDPE, density greater than 0.944 g/cm$^3$), moderate density polyethylene (MDPE, density 0.926–0.940 g/cm$^3$, linear moderate density polyethylene (LMDPE, density 0.926–0.940 g/cm$^3$), low density polyethylene (LDPE, density 0.910–0.925 g/cm$^3$) and linear low density polyethylene (LLDPE, density 0.916–0.925 g/cm$^3$), polypropylene, poly-1-butene, poly-3-methylbutene, poly-4-methylpentene and copolymers thereof, such as for example of polyethylene with vinyl acetate, vinyl acetate and acrylic esters, vinyl alcohol, acrylic acid, for example ionomer resins, such as copolymers of ethylene with about 11% of acrylic acid, methacrylic acid, acrylic esters, methacrylic esters, tetrafluoroethylene or polypropylene, and random copolymers, block copolymers or olefin polymer-elastomer mixtures.

Examples of thermoplastics based on styrene are polystyrene, copolymers and terpolymers thereof, copolymers with acrylonitrile (SAN), copolymers with butadiene (SB) and terpolymers containing synthetic rubbers and acrylonitrile (ABS).

The polymers of vinyl chloride and vinyl plastics containing vinyl chloride units in their structure, such as polyvinyl chloride, copolymers and graft polymers thereof, for example vinyl chloride-ethylene polymer, vinyl chloride-ethylene-methacrylate polymer, vinyl chloride-ethylene-vinyl acetate polymer, vinyl chloride-methylmethacrylate polymer, vinyl chloride-octylacrylate polymer, vinyl chloride-vinylidene chloride polymer, vinyl chloride-vinyl acetate-maleic acid polymer, or vinyl chloride-vinylidene chloride-acrylonitrile polymer, and grafted modifications, may be mentioned as thermoplastics based on vinyl which may be used. The thermoplastics based on vinyl may also be plasticized in a manner known per se using primary or secondary plasticizers.

The uppermost layer of the substrate film, or of the substrate film composite against which the extruded film is laminated, preferably contains a polyolefin, such as polyethylene or polypropylene, polyamide, such as polyamide 6,6, polyester or copolyester, such as polyalkylene terephthalate or copolymers containing the said polymers. Axially and in particular biaxially oriented films and film composites are particularly preferred as the uppermost layer on a substrate film. Axially or biaxially oriented films containing or consisting of polyethylene terephthalate are most particularly preferred.

The above-mentioned thermoplastic plastics may be used as thermoplastic plastics, the melts of which are extruded to form a coating film. Preferred examples are the polyolefins, as mentioned above. Polyethylenes, polypropylenes and their modified forms are particularly preferred examples of thermoplastic plastics which may be extruded.

For the substrate film, the metal or aluminum film in particular has significance as a barrier layer and thus in particular as a barrier layer to light, gases and vapors. Other barrier layers, for example ceramic layers or metallic layers may therefore also be used instead of or together with the metal film or the metal films. The ceramic or metallic layers in turn usually require a substrate, preferably a plastic film, such as for example a polyester film, such as a polyalkylene terephthalate film, a polyolefin film, a polyamide film or a polyvinylchloride film.

The oxides and/or nitrides of metals or semi-metals, for example those of silicon, aluminum, iron, nickel, chromium or lead, may be used as the ceramic layer. This also includes the oxinitrides of the said metals or semi-metals. Oxides of the general formula $SiO_x$, wherein x is a number from 1 to 2, or of the general formula $Al_yO_z$, wherein y/z is a number from 0.2 to 1.5, are advantageously used as the ceramic layer.

The silicon oxides or aluminum oxides are advantageous as ceramic layers. The silicon oxides may have the formula $SiO_x$, wherein x is preferably a number from 1 to 2, particularly preferably from 1.1 to 1.9 and in particular from 1.2 to 1.7. The aluminum oxides may have the formula $Al_yO_z$, wherein y/z is, for example a number from 0.2 to 1.5 and preferably from 0.65 to 0.85.

The ceramic layer is applied, for example by thin-layer vacuum technology, advantageously on the basis of electron beam evaporation or resistance heating or inductive heating from converters. Electron beam evaporation is preferred. The processes described may be carried out reactively and/or with ion assistance.

The thickness of the ceramic layer may be 5 to 500 nm, wherein layer thicknesses of 10 to 200 nm are preferred and 40 to 150 nm are particularly preferred.

The barrier layer may also be a metallic layer. Examples of metallic layers are aluminum layers or copper layers. Metallic layers are usually applied by sputtering, evaporation or currentless chemical or electrolytic deposition, for example on a plastic layer.

Metallic layers are, for example 5 to 500 nm, advantageously 10 to 200 nm, and preferably 40 to 150 nm thick.

It is also preferable to use a plastic film with barrier properties on its own or in a composite with other plastic films, as mentioned individually above, as the substrate film. Films having barrier properties are known per se and may consist, for example of ethylene vinyl alcohol copolymers, polyvinylidene chloride, polyacrylonitrile, for example BAREX, polyacrylic-polyamide copolymers, barrier layer copolyesters, for example Mitsui B-010, aromatic and amorphous polyamides, for example N-MXD6 from Mitsubishi Gas Chemical, or contain these polymers.

The above-mentioned plastic films and metal films may be processed in a manner known per se to form the corresponding laminates or composites which serve as substrate film.

In practice, for example laminating adhesives and/or adhesion promoters are used to join the plastic films with one another, the metal films with one another, the plastic films with metal films or in the case of film composites, also between these composites. Suitable adhesion promoters are, for example vinyl chloride copolymers, polymerizable polyesters, vinyl pyridine polymers, vinyl pyridine polymers in combination with epoxy resins, butadiene-arylnitrile-methacrylic acid copolymers, phenol resins, rubber derivatives, acrylic resins, acrylic resins with phenol or epoxy resins, organic silicon compounds, such as organosilanes, modified polyolefins, such as acid-modified polyolefins or ethylene acrylic acid (EAA).

Further suitable adhesion promoters are adhesives, such as nitrile rubber-phenol resins, epoxides, acrylonitrile-butadiene rubber, urethane-modified acrylics, polyester copolyamides, hot-melt polyesters, polyisocyanates cross-linked with hot-melt polyester, polyisobutylene-modified styrene-butadiene rubbers, urethanes, ethylene-acrylic acid mixed polymers and ethylene vinyl acetate mixed polymers.

If laminating adhesives are used, the laminating adhesives may contain solvent or may be solvent-free and may also contain water. Examples are solvent-containing, solvent-free or aqueous acrylate adhesives or polyurethane adhesives.

Laminating adhesives based on polyurethane are preferred.

It is often advantageous to impart an adequate surface tension to the adhesion promoter layer on the side facing the adhesive to assist and improve the joining adhesion of adhesion promoter and laminating adhesive between the layers of a substrate film composite. The surface tension may be increased, for example by flame pre-treatment or corona treatment.

The individual layers of the substrate film may be laminated, for example by hot calendering, laminating, extrusion coating or by co-extrusion coating.

The coating film of thermoplastic plastics which is produced by extrusion and laminated onto the substrate film, advantageously has a thickness of 10 $\mu$m and greater and thinner than 500 $\mu$m, wherein a thickness of 20 to 250 $\mu$m is advantageous and a thickness of 40 to 120 $\mu$m is preferred.

The thickness of the substrate film is not critical per se and depends on the intended application of the finished composite.

The corona treatment station of the invention is situated between the extruder nozzle and the roller gap.

In the embodiment according to the invention, the discharge electrode and the counter-electrode are situated on only one side of the extruded plastic film. That is to say both electrodes are situated on the same side of the plastic film, so that the surface to be treated is not directly exposed to the electric field. The discharge burns with a spark channel which is set, for example at 3 to 15 mm, and preferably 6 mm from the film surface. This is advantageously achieved using a device which has at least two pin electrodes, between which the corona discharge burns. The present invention may preferably have at least two pin electrodes, between which the corona discharge burns, and means which produce a gas jet directed onto the film to be treated. The corona discharge burns within a head piece, in particular between two dielectric-free pin electrodes.

Such means which produce a gas jet are, for example nozzles, slot nozzles, hole nozzles and the like, which are connected to a compressed gas source, such as a compressed gas container or compressor, via a pipe system.

Air, oxygen, nitrogen, argon, mixures thereof or a carbon dioxide-argon mixture are examples of gases which may be used to maintain the gas jet. The gases are preferably dry. The gases are usually used under pressure, passing the electrode and directed onto the film.

The corona treatment station is advantageously disposed in a region between the nozzle lip of the extruder and the roller gap, in which the coating film is still present as a molten or partially molten film. The corona treatment is thus advantageously compensated on a surface part of the coating film being formed, which is still in the molten state or still in the partially molten state, and has not yet solidified on that of the thermoplastic plastic.

In a further advantageous embodiment, the corona treatment station is disposed between the nozzle lip and the roller gap, wherein the corona treatment station is disposed in the space between nozzle lip and narrowest point of the roller gap, such that the corona treatment station lies nearer to the narrowest point of the roller gap than the nozzle lip.

This insures, for example that the treatment point lies deep in the extruder gap and that the treated surface is not disadvantageously influenced by a possible over-stretching of the molten film.

The distance between the extruder nozzle and the roller gap should be kept as low as possible. A short distance between the nozzle lip and the roller gap means a relatively short cooling zone. This also means that the temperature of the melt in the extruder may be kept relatively low.

The corona treatment device in the roller gap, which for its part is narrow, makes it possible in particular to keep the distance between nozzle lip and roller gap very small. The gas of the corona treatment station may also be pre-heated to further control the temperature of the extruded plastic film.

The device of the invention is advantageously equipped such that the corona treatment station is disposed between the nozzle lip and the roller gap, wherein the corona treatment station is disposed in the space between nozzle lip and narrowest point of the roller gap, such that the corona treatment station lies nearer to the narrowest point of the roller gap than the nozzle lip.

Figure 2:
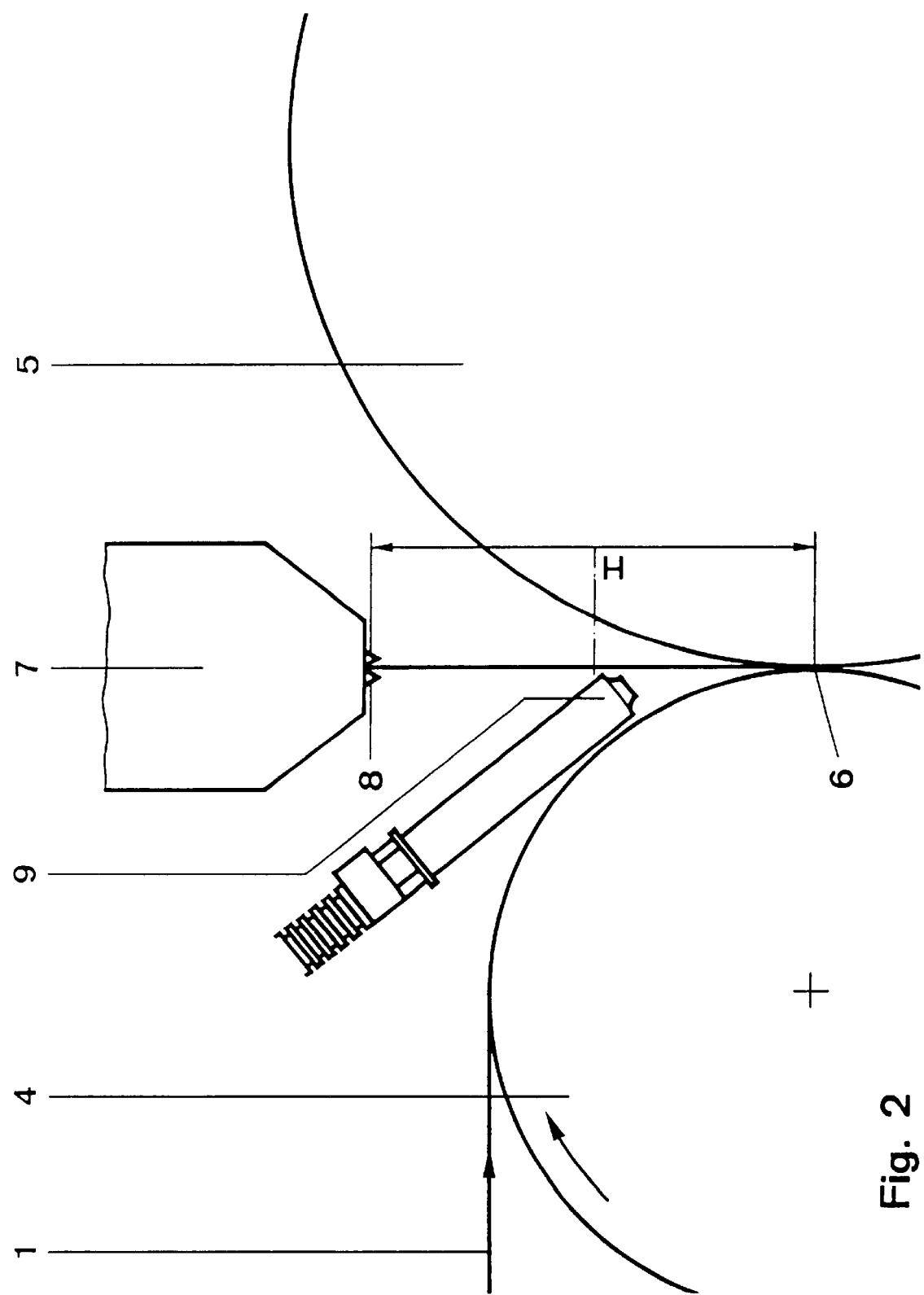
FIG. 2 shows a section of the device shown in FIG. 1.

FIGS. 1 and 2 illustrate the present invention in more detail by way of example.

FIG. 1 shows a schematic representation of the device for producing laminates according to the present invention. The substrate film (1) is unwound from a roll (2) and optionally supplied to a contact roller (4) to activate the surfaces by means of corona treatment (3) or a further known type of treatment. Contact roller 4 together with the cooling roller (5) form a roller gap (6). The nozzle lip (8) of an extruder (7) is directed towards this roller gap (6). The corona discharge device (9) is situated deep in the roller gap (6).

FIG. 2 shows a section of the device described above. The contact roller (4) and the cooling roller (5), which form the roller gap (6), also the extruder (7) with nozzle lip (8) and the corona treatment station (9), can be seen. H designates the distance between the nozzle lip and the narrowest point of the roller gap (6). The corona treatment station (9) should advantageously be situated below half the distance H.

The present invention also relates to a process for producing extrusion-coated laminates in the device of the invention, wherein the extruded film is subjected to corona discharge treatment. The film is preferably exposed to corona discharge treatment on one side. In, particular the corona discharge burns between at least two pin electrodes and is steered by means of a gas jet directed onto the film.

The corona discharge treatment is advantageously carried out on a surface part of the coating film being formed which is still in the molten state or still in the partially molten state.

In a previous device for carrying out the process, the casting rate may be adjusted and where applicable other parameters as the cooling rate may be adjusted, for example by the temperature of the melt of thermoplastic plastic, such that the film formed or the coating film is still in the molten state, at least on the surface, if corona discharge acts on the relevant surface.

In the corona discharge treatment of the invention, the film may be treated at a rate of 5 to 500 m/minute. A rate of 80 to 200 m/minute is advantageous. The width of the film may be, for example 80 to 2,200 mm, wherein widths of 600 to 1,400 mm are preferred. The corona treatment device is operated, for example using a generator having a capacity up to 30 kW. The alternating voltage is thus, for example between 12 to 20 kV. The frequency is advantageously about 20 kHz and above, usually up to 30 kHz, wherein frequencies between 25 and 30 kHz are preferred.

If a directional gas jet is provided for operating the corona treatment device, the gas flow may be, for example up to 1,000 1/hour. A gas flow of 200 to 600 1/hour is advantageous and a gas flow at a rate of 400 1/hour is particularly preferred.

In practice the films to be treated are treated to surface energy of, for example 36 to 60 mN/m.

The present process may considerably increase joining adhesion of an extrusion-coated film onto a substrate film and may replace other pre-treatments or strengthen the effect of known pre-treatments.

The substrate film may optionally also be coated with an adhesion promoter or an adhesive on the side to be coated. The adhesion of the coating film to the substrate film treated with an adhesion promoter or adhesive is then increased by means of the treatment of the invention.

The present process also makes it possible to achieve extrusion coating directly onto a substrate without using an adhesive or an adhesion promoter.

Other advantages lie in being able to process thermoplastic plastics at lower temperatures than hitherto to form the coating films.

I claim:

1. A process for forming extrusion-coated laminates, which comprises the steps of:

passing a substrate film between a roller gap formed by a cooling roller and a contact roller, wherein the roller gap has a narrowest point;

forming a thermoplastic coating film having a surface part from a nozzle lip of an extruder nozzle and directing the lip toward the roller gap for causing the coating film to enter the roller gap;

joining the coating film to the substrate film in the roller gap;

providing a corona treatment station including two pin electrodes wherein between the electrodes a corona discharge burns, wherein the electrodes are comprised of a discharge electrode and a counter-electrode both located on one side of the coating film to provide a corona treatment on the coating film for promoting adhesion of the coating film to the substrate;

disposing the corona treatment station in a region between the extruder nozzle lip and the narrowest point of the roller gap at a slight distance from the coating film, wherein the station is positioned closer to the narrowest point than to the nozzle lip; and subjecting the surface part of the extruded coating film to a corona discharge treatment from the corona treatment station while the coating film is at least partly in a molten state.

2. Process according to claim 1, further including the step of steering the corona discharge by means of a gas jet directed onto the extruded film.

3. Process according to claim 1 including the step of steering the corona discharge on to the extruded film by means of a directional jet containing at least one material selected from the group consisting of air, oxygen, nitrogen, argon and a carbon dioxide-argon mixture.

4. Process according to claim 1 including the step of providing a composite as substrate film.

5. Process according to claim 1 including the step of situating the nozzle lip at a distance from the narrowest point of the roller gap, and including the step of positioning the corona treatment station below half the distance between the nozzle lip and said narrowest point.

6. Process according to claim 1 wherein the corona discharge burns with a spark channel which is 3 to 15 mm from the film surface.

7. Process according to claim 1 including the step of treating the film at a rate of 5 to 500 meters per minute.

8. Process according to claim 1 wherein the corona treatment station is operated using alternating voltage between 12 and 20 kV, and at a frequency between 25 and 30 kHz.

* * * * *